C. CLEIREN.
MEANS FOR TRANSMITTING POWER.
APPLICATION FILED JAN. 19, 1909.
965,084.
Patented July 19, 1910.
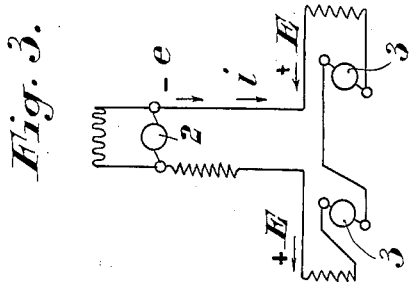
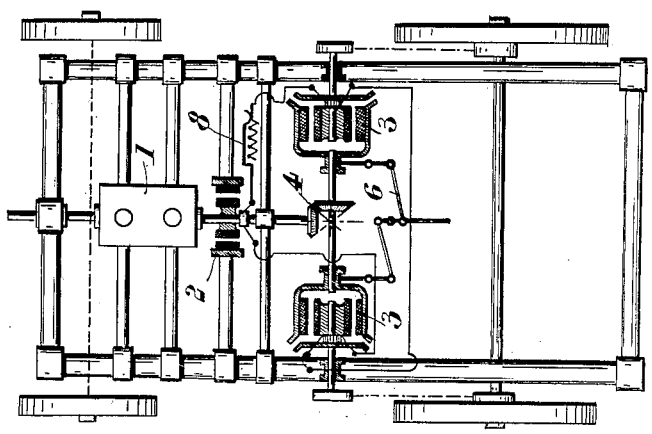
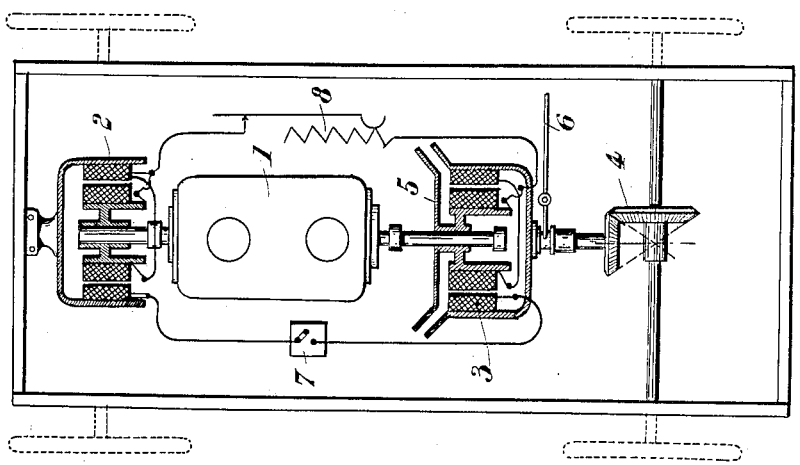

UNITED STATES PATENT OFFICE.

CHARLES CLEIREN, OF BRUSSELS, BELGIUM.

MEANS FOR TRANSMITTING POWER.

965,084.
Specification of Letters Patent.
Patented July 19, 1910.

Application filed January 19, 1909. Serial No. 473,141.

*To all whom it may concern:*

Be it known that I, CHARLES CLEIREN, citizen of Belgium, residing at Brussels, Belgium, have invented new and useful Improvements in Means for Transmitting Power, of which the following is a specification.

In automobile vehicles the motor is generally connected with the driving wheels through the intermediary of speed reducing gear intended to reduce the velocity of speed when the resistance to be overcome increases, in such a manner as to increase the motor couple proportionately. The greatest reduction of speed, commonly termed the "first speed" must give a couple sufficient to permit of starting under the most unfavorable conditions and of climbing the steepest hills at a certain speed. When starting has been effected, or when the hill has been mounted, the resistance decreases and the motor couple becomes too powerful; the total power of the motor can then only be utilized if the gearing-down is modified in such a manner as to diminish the motor couple and consequently increase the speed of rotation of the wheels.

In order to utilize the power developed by the motor in as complete a manner as possible, it is essential that it should be possible to vary the gearing-down (and consequently the motor couple) every time the resistance varies owing to the changing gradient of the road. These changes of speed obtained manually by acting upon suitable clutches by means of operating levers only permit of obtaining a very limited number of different speeds and their operation calls for constant care and attention on the part of the driver of the vehicle.

Electrical gearing down mechanisms have been utilized in which a dynamo electric coupling, inserted in the mechanism connecting the driving shaft with the driven shaft, permits the latter to rotate at a lesser speed than by direct drive and the current produced in the dynamo electric coupling by reason of this difference of speed has been utilized in several ways: In some of these mechanisms the full speed is obtained by coupling the field magnet and the armature of the dynamo electric coupling by means of a clutch in order to run in direct drive.

The present invention has for its subject a power transmitting mechanism in which the "first speed" is obtained by connecting the motor with the road wheels by means of gearing-down mechanism giving the maximum motor couple necessary, and when the resistant couple diminishes, the available power of the motor is transmitted electrically to the road wheels in such a manner as to increase their speed and to cause this speed to vary automatically in inverse ratio to the resistance due to the changing gradient of the road.

In other words the present invention consists of inserting in the mechanism connecting the driving shaft with the driven shaft a "motor electric coupling" to which current is supplied by a dynamo driven by the driving shaft in order to cause the driven shaft to rotate at a greater speed than by direct drive.

The object in view is that, when starting has been effected, the work furnished by the motor should be entirely utilized by the driven shaft, whatever may be the resistance of the road so that the speed of the driven shaft can be controlled by simply regulating the power given out by the motor. This object is attained because only the excess power of the motor is transmitted electrically to the driven member in such a manner as to increase its speed.

The mechanism comprises broadly a dynamo driven by the motor and an electric motor inserted between a portion of the speed reducing gear which is directly driven by the motor and the portion of the same which is connected with the wheels of the vehicle.

One of the elements (the armature or field-magnet) of the electric motor is driven by the former portion or driving shaft of the gear and the other element drives the latter portion or driven shaft of the same.

The "first speed" is obtained by coupling the field magnet and the armature of the electric motor one with the other by means of a clutch in such a manner that the driving shaft is thereby connected directly with the driven shaft by a suitable gearing-down mechanism. When the load decreases, it is only necessary to throw the two elements of the electric motor out of gear in order that the excess power of the motor, which is converted into electricity by the dynamo, may actuate the electric motor; the latter then rotates and transmits its movement to the driving wheels, which acquire a speed increasing with the decrease of the load couple.

Instead of a single electric motor several may be employed, each of them with one element connected with the driving shaft and the other with the driven shaft.

In the accompanying drawing; Figure 1 is a diagrammatical view of an embodiment of the invention showing both a mechanical coupling and electrical connections for causing the two elements of the motor electric coupling to turn at the same speed. Fig. 2 is a similar view showing both a mechanical coupling and electrical connections for transmitting power to two driven shafts, and Fig. 3 is a similar view illustrating the electric circuits including the dynamo and motor.

Referring to Fig. 1, 1 designates the motor and 2 a fixed dynamo the armature of which is mounted upon the driving shaft. This shaft carries at its other end the armature of an electric motor 3, the field magnets of which are mounted upon a transmission shaft connected to the driving axle by the gearing-down mechanism 4. A clutch 5, actuated by an operating lever 6, enables the two elements of the electric motor 3 to be coupled one with the other. The gearing down mechanism is such that when the two elements of the electric motor are thus coupled together the necessary maximum couple is obtained on the driven shaft. The cone clutch shown in the drawing may be replaced by any other suitable mechanism and in particular by mechanism such as a slipping clutch for the purpose of facilitating starting.

As shown in Fig. 1 the electric motor 3 may be made to act as a slipping clutch by taking up the current produced by the variable electrical resistances 8 which are progressively withdrawn from the circuit as the slipping decreases according to a well known method.

A single driving shaft can be made to actuate several motor electric couplings. Fig. 2 shows an arrangement in which the two driving wheels of a vehicle are provided with separate motor electric couplings 3, 3, each of which has one of its elements driven by the driving shaft through a gearing-down mechanism 4 while its other element drives the wheels and the gearing-down mechanism is so designed that for each of these motor electric couplings the maximum couple is supplied to the driven shaft when both elements turn at the same speed.

In order to obtain the "first speed" the clutch 5 is actuated by means of the lever 6 whereby the motor is connected directly with the driven shaft through the gear 4. As soon as the road resistance decreases, as the total power of the motor can no longer be utilized, the clutch 5 is thrown out and the current of the dynamo 2 is sent into the electric motor 3, the field magnet of which is thus caused to rotate relatively to its armature and in the same direction. The speed of the vehicle is then increased by the difference of speed between the field magnet and the armature, which increases in proportion as the road resistance decreases, the available power of the motor for producing electrical energy then becoming proportionately greater.

The electrical connections between the dynamo 2 and the electric motor 3 vary according to the type of machine and the nature of the current utilized.

In the example here represented, when the two elements of the electric motor 3 are in engagement, the interrupter 7 is open and no current passes in the system.

When the two elements of the electric motor are disengaged, the interrupter 7 is closed. The series winding of the machine 2 causes it to produce the current necessary for driving the field magnet of 3 and the shunt winding automatically increases the tension at the terminals of the machine 2 in proportion as the speed of the electric motor increases.

Having now described my invention, what I claim as new and desire to secure by Letters Patent is:

1. Means for transmitting power comprising in combination a driving shaft, a driven shaft, a motor electric coupling, a clutch for causing the two elements of the said motor electric coupling to turn at the same speed, one of the elements of the said motor electric coupling being driven by the driving shaft, and the other element of the said motor electric coupling driving the driven shaft, the mechanical connections being so made that the necessary maximum couple on the driven shaft is obtained when the said two elements turn at the same speed, and an electric generator driven by the driving shaft and sending its current into both elements of the motor electric coupling.

2. Means for transmitting power comprising in combination a driving shaft, a driven shaft, a motor electric coupling, electrical means for causing the two elements of the said motor electric coupling to turn at the same speed, one of the elements of the said motor electric coupling being driven by the driving shaft, and the other element of the said motor electric coupling driving the driven shaft, the connections being such that the necessary maximum couple in the driven shaft is obtained when the said elements turn at the same speed and a dynamo electric machine driven by the driving shaft and sending its current into both elements of the motor electric coupling.

3. Means for transmitting power comprising in combination a driving shaft, a driven shaft, a motor electric coupling, a clutch for causing both elements of the said motor electric coupling to turn at the same speed, one of the elements of the said motor electric coupling being driven by the driving shaft, and the other element of the said motor electric coupling driving the driven shaft, the mechanical connections being so arranged that the necessary maximum couple on the driven shaft is obtained when the said two elements turn at the same speed and an electric generator driven by the driving shaft and sending its current into both elements of the said motor electric coupling.

4. Means for transmitting power comprising in combination a driving shaft, a driven shaft, a motor electric coupling, a clutch for causing both elements of the said motor electric coupling to turn at the same speed, one of the elements of the said motor electric coupling being driven by the driving shaft and the other element of the said motor electric coupling driving the driven shaft; the mechanical connections being so arranged that the necessary maximum couple on the driven shaft is obtained when both the said elements turn at the same speed and an electric generator driven by the driving shaft and sending its current into both elements of the said motor electric coupling.

5. Means for transmitting power comprising in combination a driving shaft, a driven shaft, a motor electric coupling, a clutch for causing both elements of the said motor electric coupling to turn at the same speed, one element of the said motor electric coupling being driven by the driving shaft, and the other element of the said motor electric coupling driving the driven shaft, the mechanical connections being so arranged that the necessary maximum couple on the driven shaft is obtained when both the said elements turn at the same speed, and an electric generator driven by the driving shaft and sending its current into both elements of the said motor electric coupling.

6. Means for transmitting power comprising in combination a driving shaft, a plurality of driven shafts, a motor electric coupling for each of the said driven shafts, an electric arrangement for causing both elements of each of the said motor electric couplings to turn at the same speed, one element of each of the said motor electric couplings being driven by the driving shaft, and the other element of each of the said motor electric couplings driving the corresponding driven shaft, the mechanical connections being so arranged that the necessary maximum couple on the driven shafts is obtained when both elements of the motor electric couplings turn at the same speed, and a dynamo driven by the driving shaft and sending its current to both elements of the said motor electric couplings.

In testimony whereof I have signed my name to this specification in the presence of two subscribing witnesses.

CHARLES CLEIREN.

Witnesses:
H. T. E. KIRKPATRICK,
AD. VOGEL.